Feb. 10, 1931.  A. S. EMMERSON  1,791,664
VEHICLE SIGNAL
Filed April 5, 1930
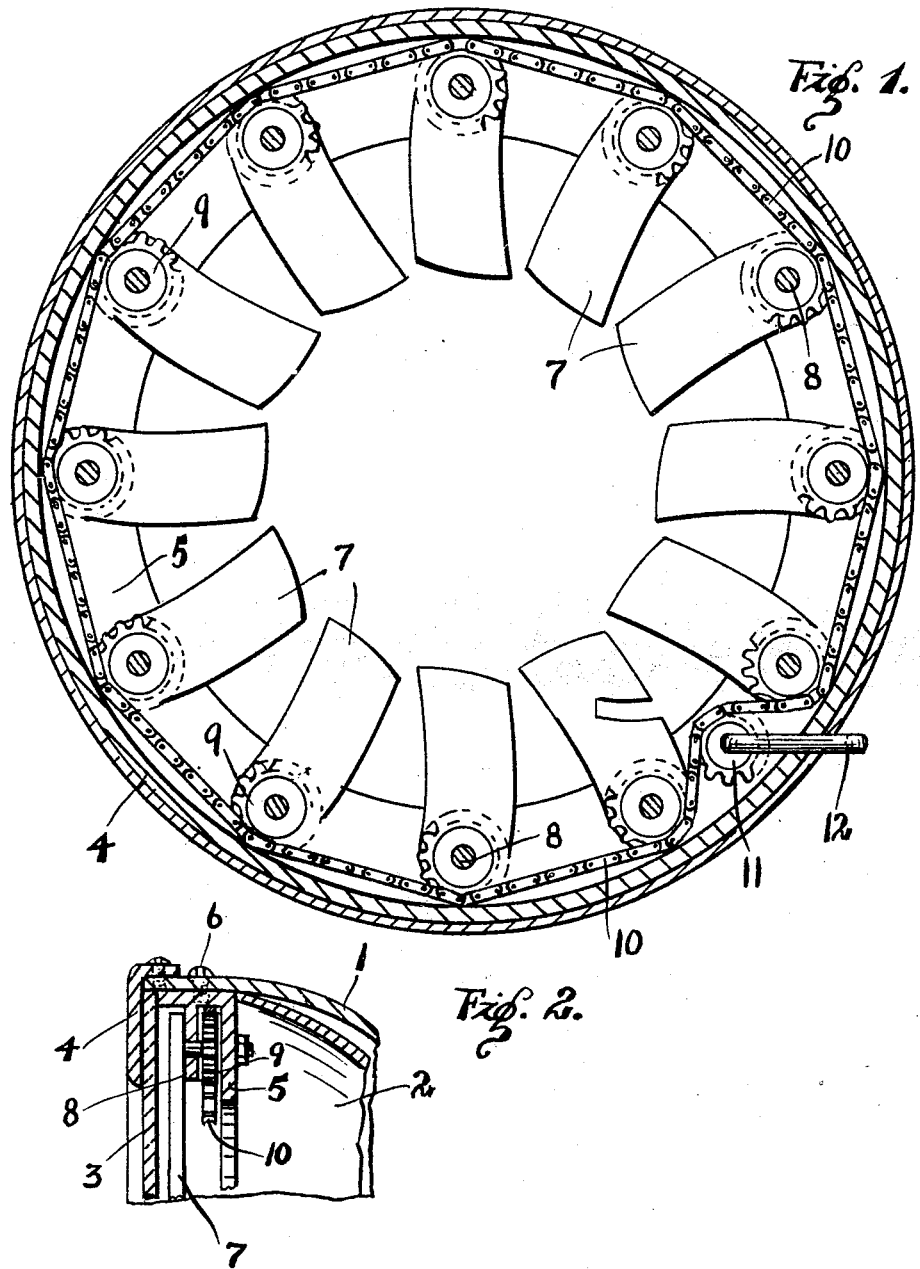
INVENTOR
ALBERT S. EMMERSON
BY
ATTORNEY.

Patented Feb. 10, 1931

1,791,664

UNITED STATES PATENT OFFICE

ALBERT S. EMMERSON, OF COMPTON, CALIFORNIA

VEHICLE SIGNAL

Application filed April 5, 1930. Serial No. 441,798.

This invention relates to a vehicle signal positioned in the headlight whereby an approaching vehicle can tell the direction in which the other vehicle is about to turn.

An object of my invention is to provide a signal in the headlamp of the vehicle, said signal being readily and quickly operable by the driver, to give a positive signal of an intention to turn.

Another object is to provide a signal which is compact, which is inexpensive to manufacture, which is easily installed, and which can be mounted upon the usual and well-known type of headlamps.

Other objects, advantages, and features of invention may appear from the accompanying drawing, the subjoined detailed description and the appended claims.

In the drawing

Figure 1 is a front elevation of a headlamp, the lens being removed and the holding ring being in section.

Figure 2 is a fragmentary, transverse, sectional view of the signal and the lamp upon which it is mounted.

Referring more particularly to the drawing, the numeral 1 indicates the usual headlamp housing which encloses the reflector 2. The usual front lens 3 is held in position by a circular ring 4. An annular frame 5 is mounted inside of the housing 1 and is secured thereto by a plurality of screws, or the like, 6.

A plurality of signaling vanes 7 are pivotally mounted on the frame 5 by pins 8 which are secured to the vanes and are journaled in the frame. To each of the pins 8, I secure a sprocket 9 and a chain 10 partly encircles all of the said sprockets, thus it will be evident that as the chain is actuated, the vanes 7 will all be simultaneously moved. The chain 10 also partly encircles an actuated sprocket 11, which sprocket is pivotally mounted on the frame 5. An operating crank 12 is secured to the sprocket 11 and is actuated by any desirable manual means which extends to the driver's compartment and which is not shown.

As the crank 12 is moved, the chain 10 will be pulled about the sprocket 11, thus simultaneously rotating all of the sprockets 9 to swing the vane 7 into signaling position as shown in Figure 1, or into folded and concealing position as desired. The vanes 7 are hidden behind the ring 4 when not in signaling position.

Having described my invention, I claim:

1. In combination with a vehicle headlamp, a signal comprising an annular frame, means securing said frame within the headlamp, a plurality of vanes pivotally mounted on said frame, a sprocket secured to each of the vanes, a continuous chain engaging each of the sprockets, and means to actuate said chain whereby said vanes are simultaneously rotated on their axes into either signaling or concealing position.

2. In combination with a vehicle headlamp, a signal comprising an annular frame, means securing said frame within the headlamp, a plurality of vanes pivotally mounted on said frame, a sprocket secured to each of the vanes, a continuous chain engaging each of the sprockets, an actuating sprocket journaled on the frame, said chain partly encircling said last named sprocket, and manual means to rotate said last named sprocket.

3. In combination with a vehicle headlamp including a housing, a lens and a ring securing the lens to the front of the housing, of a signal comprising an annular frame, screws extending through the housing into the frame, a plurality of vanes adapted to extend partly across the headlamp, a pin on each of the vanes, said pin being journaled in the frame, a sprocket secured to each of the posts, an endless chain partly encircling all of said sprockets, an actuating sprocket journaled on the frame, said chain partly encircling said last named sprocket and manual means to rotate said last named sprocket whereby said vanes are moved into signaling or non-signaling position.

In testimony whereof, I affix my signature.

ALBERT S. EMMERSON.